United States Patent [19]

Sehier et al.

[11] Patent Number: 5,548,618
[45] Date of Patent: Aug. 20, 1996

[54] DEVICE FOR DETECTING BPSK MODULATED SINGULAR WORDS SUITABLE FOR A TDMA ANALOG MODEM AND DETECTION METHOD USED THEREIN

[75] Inventors: Philippe R. Sehier, Levallois-Perret; Yannick L. Le Pape, Asnieres, both of France

[73] Assignee: Alcatel Telspace, Nanterre Cedex, France

[21] Appl. No.: 266,458

[22] Filed: Jun. 27, 1994

[30] Foreign Application Priority Data

Jun. 29, 1993 [FR] France ................... 93 07905

[51] Int. Cl.⁶ ................................................ H04J 3/24
[52] U.S. Cl. ................ 375/343; 375/368; 370/94.2
[58] Field of Search ........................ 375/342, 343, 375/361, 368; 370/93, 94.2, 105.4; 329/304

[56] References Cited

U.S. PATENT DOCUMENTS

| | | |
|---|---|---|
| 4,034,305 | 7/1977 | Sato . |
| 4,035,581 | 7/1977 | Milcz et al. ................ 375/368 |
| 4,412,340 | 10/1983 | Bartlett et al. . |
| 4,587,662 | 5/1986 | Langewellpott ............ 375/343 |
| 4,897,659 | 1/1990 | Mellon ........................ 375/368 |
| 5,138,632 | 8/1992 | Uchida ....................... 375/343 |
| 5,365,549 | 11/1994 | Kazecki ...................... 375/343 |

FOREIGN PATENT DOCUMENTS

0353779A2  2/1990  European Pat. Off. .

*Primary Examiner*—Stephen Chin
*Assistant Examiner*—Timothy J. May
*Attorney, Agent, or Firm*—Sughrue, Mion, Zinn, Macpeak & Seas

[57] ABSTRACT

A device for recovering the carrier of a TDMA signal supplies the complex envelope of this signal on a real channel and an imaginary channel. Circuitry for offsetting the constellation of the complex envelope by $\pi/4$ supply a complex signal on a main channel and on an auxiliary channel. An energy detector arrangement controls a multiplexer so that it supplies to a correlator whichever of the real or imaginary channels conveys the greater energy. The correlator calculates the correlation level between the multiplexer output signal and a reference singular word. An arrangement for comparing the correlation level with a threshold value indicates detection of the singular word in the signal on the channel applied to the correlator.

3 Claims, 6 Drawing Sheets

TDMA PACKET

DEVICE FOR DETECTING BPSK MODULATED SINGULAR WORDS SUITABLE FOR A TDMA ANALOG MODEM AND DETECTION METHOD USED THEREIN

BACKGROUND OF THE INVENTION

1. Field of the Invention

The field of the invention is that of synchronizing an analog modem receiving signals such as radio signals to receive digital data packets.

2. Description of the Prior Art

To be more precise, the present invention concerns a device adapted to detect what is referred to as a singular word in the preambles of TDMA (time-division multiple access) packets. The device of the invention can, among other things, be used for the transmission of signals by satellite. The invention also concerns a detection method used in a device of this kind.

FIG. 1 shows the structure of a TDMA packet 10. The packet 10 includes a preamble comprising words RP, RR and MU. This preamble is followed by data D constituting the wanted information.

The word RP is a carrier recovery preamble and comprises a succession of identical symbols, for example the symbol 11 (unmodulated carrier).

The word RR is a timing recovery preamble and comprises alternating symbols, for example symbols 00 alternating with symbols 11 or symbols 10 alternating with symbols 01.

The word MU is the singular word and is used to identify the first symbol of the data D. For example, it comprises 32 symbols taking their value from the set {00, 11} (QPSK modulation where only two opposite states are used). Hereinafter the symbol 00 corresponds to a 0 sample and the symbol 11 corresponds to a 1 sample. The position of this singular word MU is detected by correlation at a modem receiving such packets.

In the transmission system to which the present invention relates the data is QPSK modulated (Quaternary Phase Shift Keying) and the packet preambles use only two opposite states of the constellation of four possible states so that this modulation can be regarded as BPSK modulation (Binary Phase Shift Keying).

The packets received by a modem usually originate from several remote stations and it is necessary to synchronize the various stations so that two different stations do not transmit simultaneously in the same time period. However, synchronizing the stations does not prevent time and frequency drift affecting the packets received by the modem, caused in particular by the motion of the satellite and by the fact that the transmission medium may be heterogeneous. Accordingly, each packet is received at a random time, within a time window, and on a random frequency, within a frequency window. The modem must therefore be capable of synchronizing in time and in frequency to each new packet received during a call.

This disclosure is concerned only with time synchronization, which proceeds in two phases:

timing synchronization, which consists in determining the time at which the eye diagram of the received signal is at its most open, in order to optimize the signal sampling time; timing synchronization uses the timing recovery word RR;

packet synchronization, which consists in determining the time of arrival of each packet and thus the position of the first symbol of the wanted information D.

The present invention is more particularly concerned with packet synchronization.

FIG. 2 shows a device 28 for recovering the carrier of a signal SR received by a TDMA analog modem.

The signal SR is applied to two mixers 20 and 21 and to a circuit 22 which raises the signal SR to the power 4 in order to eliminate the phase modulation. The circuit 22 is followed by a bandpass filter 23 centered on the frequency 4Fo where Fo is the carrier frequency of the channel concerned. The filter 23 drives a frequency divider 24 which divides by 4 and supplies the recovered carrier to the mixer 20 and by a phases-shifter 25 which applies a phase-shift of $\pi/2$ and drives the mixer 21. The output signals of the mixers 20 and 21 are applied to sampling devices 26 and 27 clocked by a clock signal at the symbol frequency Hs. The output signals of the sampling devices 26 and 27 constitute two channels P and Q conveying samples in phase quadrature.

The P and Q channel samples are fed to a demodulator and to a singular word detector device shown in FIG. 3. The function of this device is to indicate that a singular word has been detected in the received signal, which enables it to be located in time, and thus to indicate that the wanted information samples are available.

The P and Q channel samples are fed to level comparators 31, 32 which output a regenerated sample for each sample received. The regenerated sample has the value 1 if the received sample is positive or 0 if the received sample is negative, for example. The comparators are followed by identical correlators 33, 34 each receiving the singular word MU constituting the reference word.

FIG. 4 shows one of the correlators. The samples from the comparator on its input side are fed to an input E and pass through a succession of flip-flops 40 clocked at the symbol frequency Fs. By means of exclusive-OR gates 41, they are successively compared with the bits $C_0$ through $C_{N-1}$ of the reference singular word MU. The number of flip-flops 40 is equal to the number of bits N in the singular word MU. The outputs of the gates 41 are summed by adders 42 which supply a correlation level Ns.

The correlator computes in each symbol time the Hamming distance between the samples received and the singular word. The correlation level Ns is equal to 0 if the correlation is maximal, i.e. if the bits supplied to the inputs of each gate 41 are identical, whereas it is maximal (approximately equal to N/2) if correlation is totally absent. In existing modems the singular word MU has the lowest possible correlation with the timing recovery word RR which precedes it so that the correlation search window can be opened before the word MU appears.

Referring to FIG. 3, the respective output levels Np and Nq of the correlators 33 and 34 are fed to combining means 35. The combining means 35 supply an output signal of level s equal to:

$$s = \text{MAX}(|N - Np - Nq|, |Np - Nq|)$$

where MAX is the function selecting the greater of the values $|N-Np-Nq|$ and $|Np-Nq|$. Thus if correlation is detected, s=N (Np=Nq=0), whereas in the absence of correlation, s≈0 (Np=Nq=N/2).

The output level s of the combining means 35 is fed to a subtractor 36 receiving a threshold value S. This subtractor supplies the value s−S to a decision unit 37 indicating whether correlation has been detected, i.e. if the singular word MU has been detected.

The threshold value S is chosen according to the noise level on the transmission link, as a compromise between a low value to enable detection of the singular word and a high value so that the decision unit 37 does not generate false alarms (spurious singular word detection).

The problem that arises with a singular word detector device of this type is that before the introduction of error correcting codes for TDMA transmission modems operated with a high signal to noise ratio. The operating threshold was around a signal to noise ratio of 9 dB for the transmission channel in question, for a bit error rate of less than $10^{-4}$. This made it possible to use a carrier recovery filter with a relatively wide bandwidth, enabling rapid acquisition of the carrier frequency.

The introduction of dedicated decoder circuits operating at high speeds now makes it possible to use high-performance error correcting codes. The use of these techniques has reduced the operating threshold considerably: it is now possible to achieve a transmission bit error rate of below $10^{-4}$ with a signal to noise ratio of only 3 dB after coding the information to be transmitted. This performance can be achieved with a ½ rate convolutional code and a constraint length of 7, for example.

The bandwidth of the phase recovery filter 23 in FIG. 2 has to be set according to the signal to noise ratio. If the ratio is high, it is possible to use a relatively wide bandwidth, producing a short acquisition time. Variation in the carrier frequency can then be dealt with quickly. On the other hand, if the ratio is low, as in the case where error correcting codes are used, the bandwidth must be reduced to minimize the probability of cycle skipping due to the divider 24 in FIG. 2. This reduction in the bandwidth is to the detriment of the acquisition time and there is therefore the risk that the carrier recovery loop will not have stabilized by the end of the preamble, which produces a bit error rate at the start of the packet, and in particular on the singular word, greater than that achieved in the middle and at the end of the packet.

This phenomenon is illustrated by curves 11 and 12 in FIG. 5 showing the phase $\phi$ of the modem carrier for a narrow loop bandwidth (curve 11) and a wide loop bandwidth (curve 12), for two successive packets 13, 14 which are also shown.

The modem receives a packet 13 including data $D_{13}$. This packet is followed by another packet 14 including a preamble as previously described and data $D_{14}$. When the packet 13 is decoded the carrier frequency generator of the modem has a phase $\phi_{13}$. At the end of the packet 13 the modem receives noise and the phase of the carrier varies erratically until the start of the preamble of packet 14. The phase of the packet 14 carrier is $\phi_{14}$ and the modem frequency generator generates a frequency whose phase is $\phi_{14}$.

For a narrow loop bandwidth there remains a phase error $\Delta\phi$ at the start of the wanted information $D_{14}$ although a wide loop bandwidth would have enabled fast stabilization of the phase well before the appearance of the wanted information. However, it is not possible to use a wide loop bandwidth because of cycle skipping (rotation of the constellation of the received signal).

The reduction in signal to noise ratio due to the use of error correcting codes has obliged manufacturers to increase the length of the preamble (words RP and RR) of each packet to ensure that at the end of each preamble there is no carrier phase error. The solution entailing lengthening the preamble is not acceptable as the efficiency of the packets (number of synchronization samples/total number of samples in a packet) is then reduced.

An object of the present invention is to provide a device for detecting a BPSK modulated singular word without requiring longer preambles than the prior art.

Another object of the invention is to enable rapid stabilization of the detected carrier phase, i.e. the use of a wide carrier recovery loop bandwidth, without the cycle skipping that can otherwise affect the received signal. A further object of the invention is to provide a method of detecting the singular word in a TDMA signal frame.

SUMMARY OF THE INVENTION

The present invention consists in a BPSK modulated singular word detector device for a TDMA modem comprising a device for recovering the carrier of a received signal and supplying the complex envelope of said received signal on a real channel and an imaginary channel, which device includes:

- means applying an angular offset of $\pi/4$ to the constellation of said complex envelope, said angular offset means supplying a complex signal on a main channel and on an auxiliary channel each comprising a real channel and an imaginary channel;

- N sample delay means on said main channel supplying time-delayed samples to a multiplexer on a time-delayed real channel and a time-delayed imaginary channel;

- estimator means on said auxiliary channel to estimate which of said real and imaginary channels of said main channel is conveying the greater energy, said estimator means supplying information to said multiplexer so that the latter supplies at its output whichever of the time-delayed real or imaginary channels of said main channel corresponds to that of said channels of said auxiliary channel conveying the greater energy;

- a correlator receiving a reference singular word and computing a correlation level between the output signal of said multiplexer and said reference singular word;

- comparator means comparing said correlation level with a threshold value to indicate detection of said singular word in the signal of said channel applied to said correlator if said correlation level is greater than said threshold value.

In a first embodiment of the invention, the estimator means advantageously comprise: p1 means summing over N samples the energy detected on each of said real and imaginary channels of said auxiliary channel;

means comparing said summed energies, said comparator means supplying said information to said multiplexer so that the latter supplies at its output whichever of said time-delayed real or imaginary channels corresponds to that of said channels of said auxiliary channel for which the sum of the energies is the greater.

In a second embodiment of the invention the estimator means comprise:

means computing the detected energy difference between each sample of said real channel and each sample of said imaginary channel received at the same time;

means summing said energy differences over N samples;

means comparing the sum of said energy differences with a reference value substantially equal to half the sum of said energy differences, said comparator means generating said information supplied to said multiplexer.

The device of the invention preferably further comprises ambiguity resolving means receiving said information supplied to said multiplexer and said correlation level and supplying to a demodulator the value of the rotation angle of said constellation relative to a reference angle.

The invention also concerns a BPSK modulated singular word detection method for a TDMA analog modem, this method consisting in:

shifting by π/4 the constellation of the complex envelope of a signal output by a carrier recovery device;

detecting which real or imaginary channel of said constellation carries the greater energy and computing a correlation level between the digital signal conveyed by this channel and a reference singular word;

supplying an indication of detection of said singular word in said signal of said channel conveying the greater energy if said correlation level exceeds a predetermined value.

Other features and advantages of the invention emerge from the following description of two preferred embodiments of the invention given by way of non-limiting illustrative example only and with reference to the appended drawings.

DETAILED DESCRIPTION OF THE PREFERRED EMBODIMENTS

FIGS. 1 to 5 have been described already in relation to the prior art.

Figure 6:
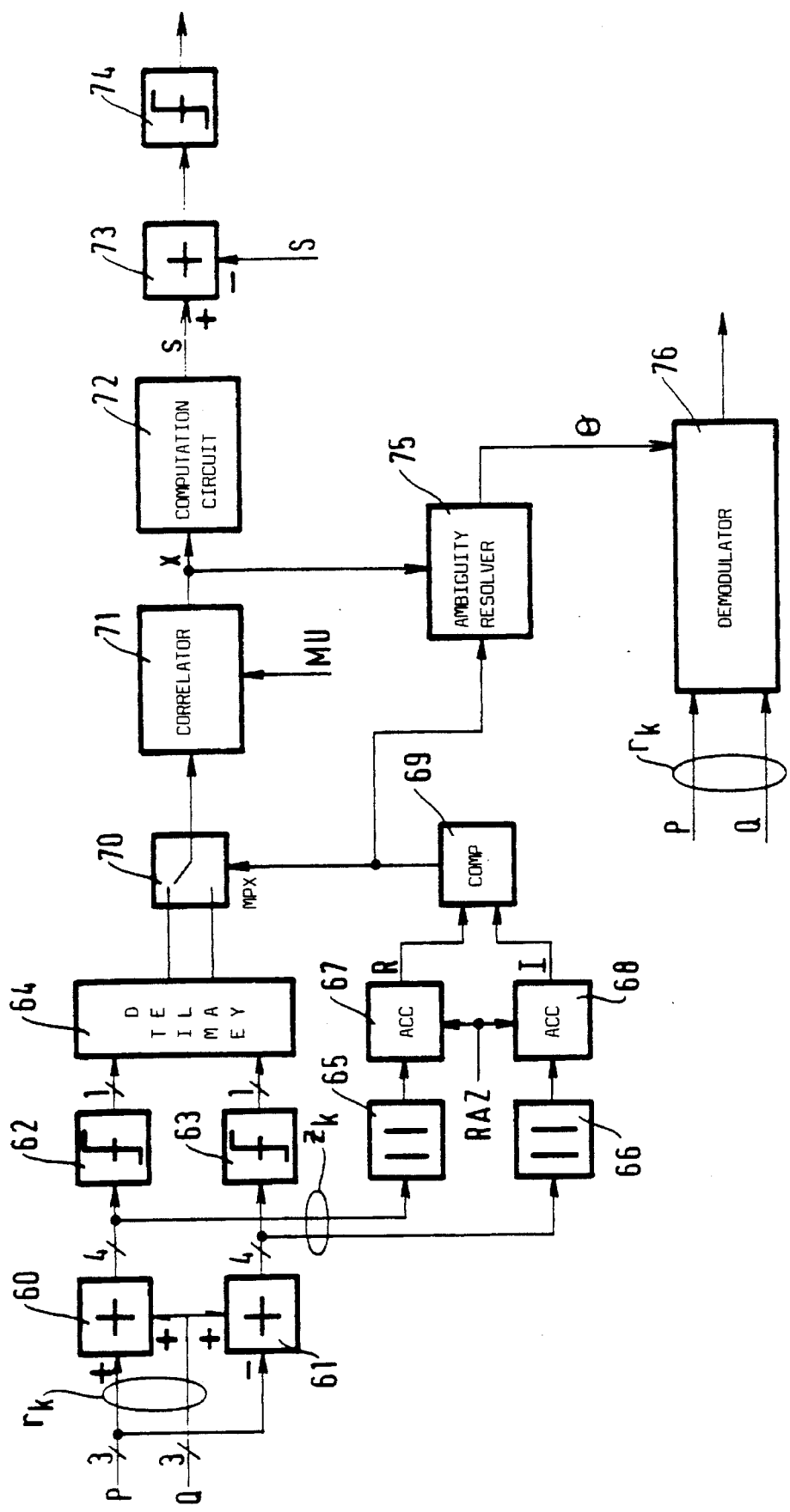
FIG. 6 is a block diagram of a first embodiment of singular word detector device in accordance with the invention.

FIG. 6 is a block diagram of a first embodiment of singular word detector device in accordance with the invention.

Figure 1:
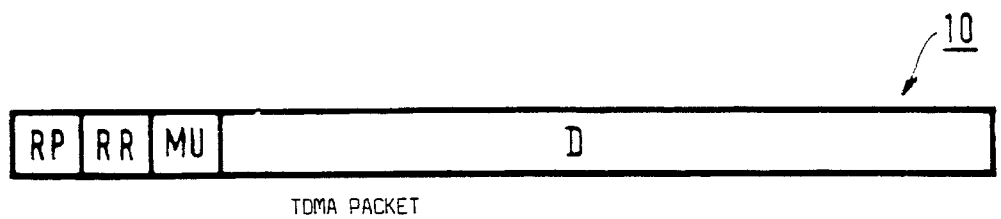
FIG. 1 shows the structure of a TDMA packet 10.
Figure 5:
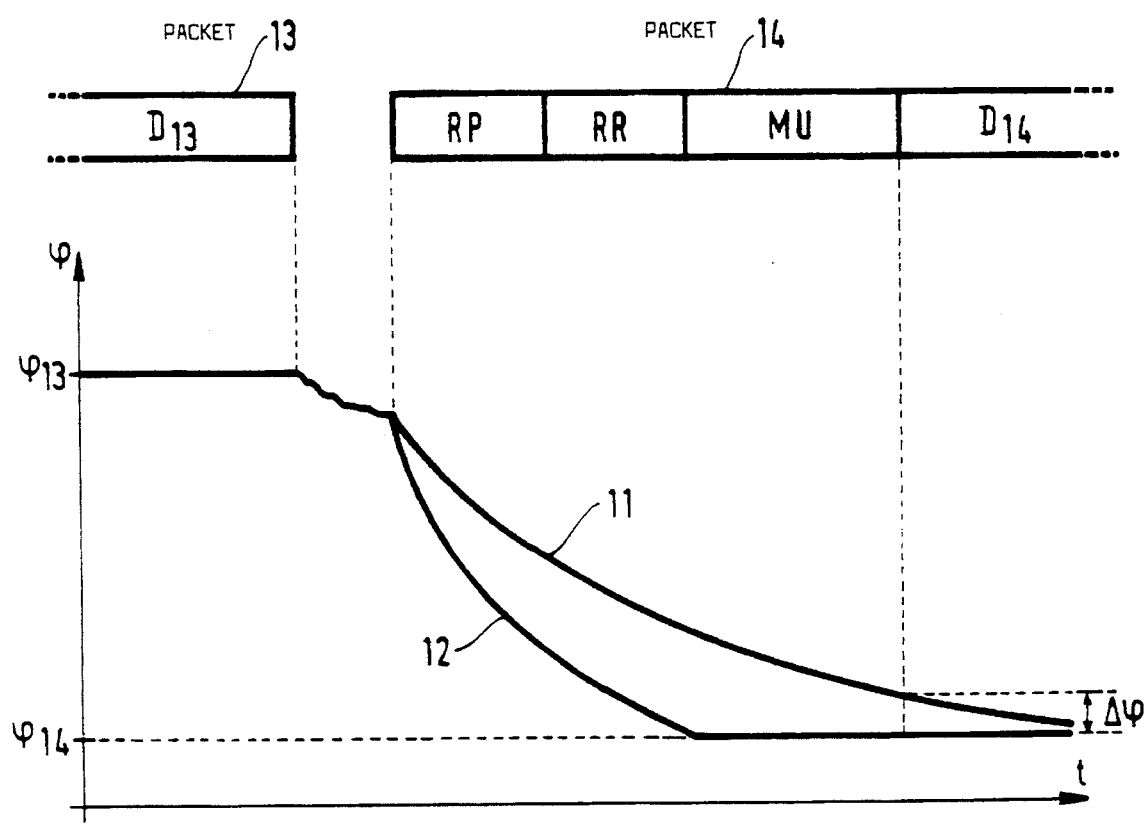
FIG. 5 shows the phase of the carrier of a modem for narrow and wide loop bandwidths.
Figure 2:
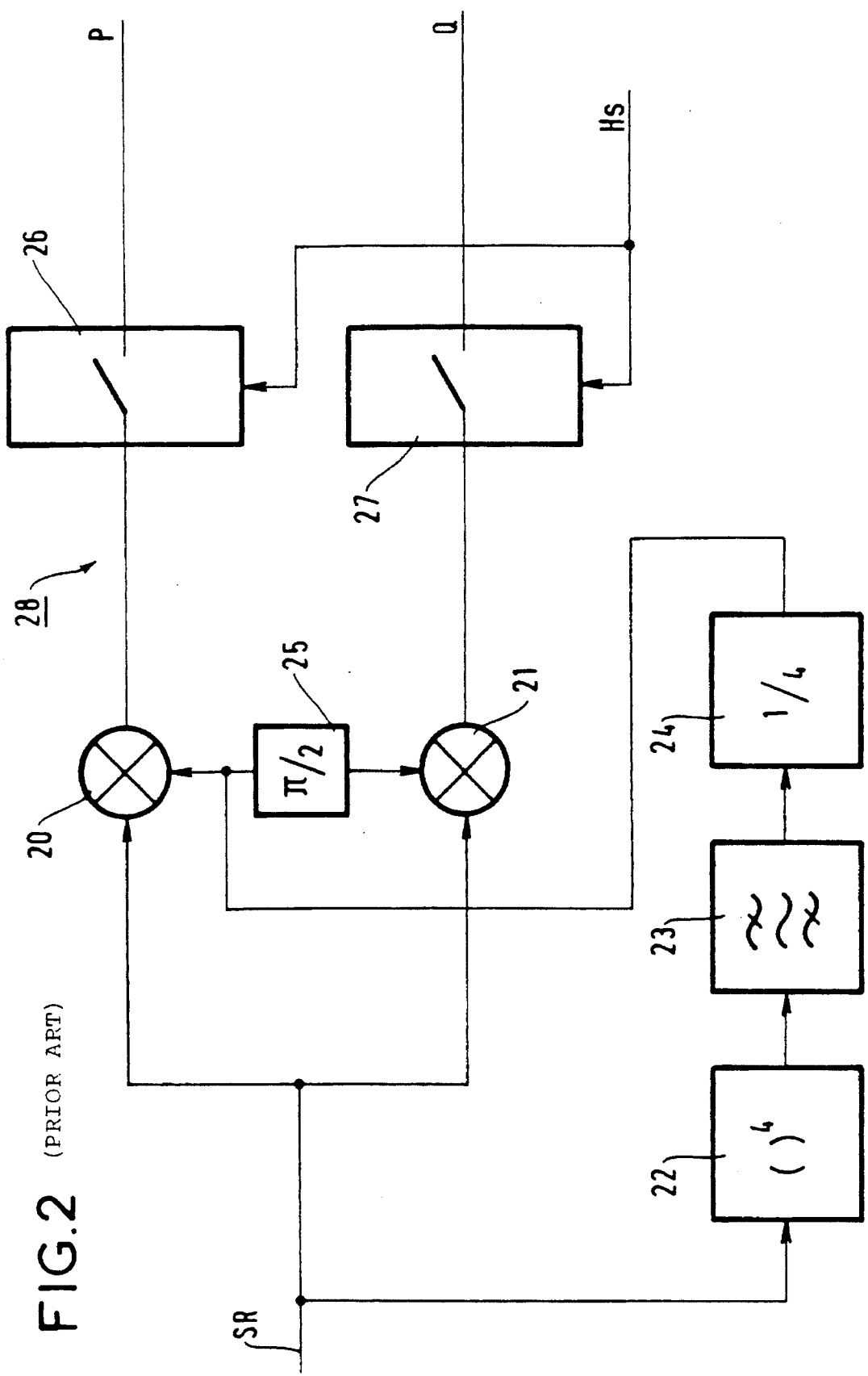
FIG. 2 shows a prior art device for recovering the carrier of a received TDMA signal.
Figure 3:
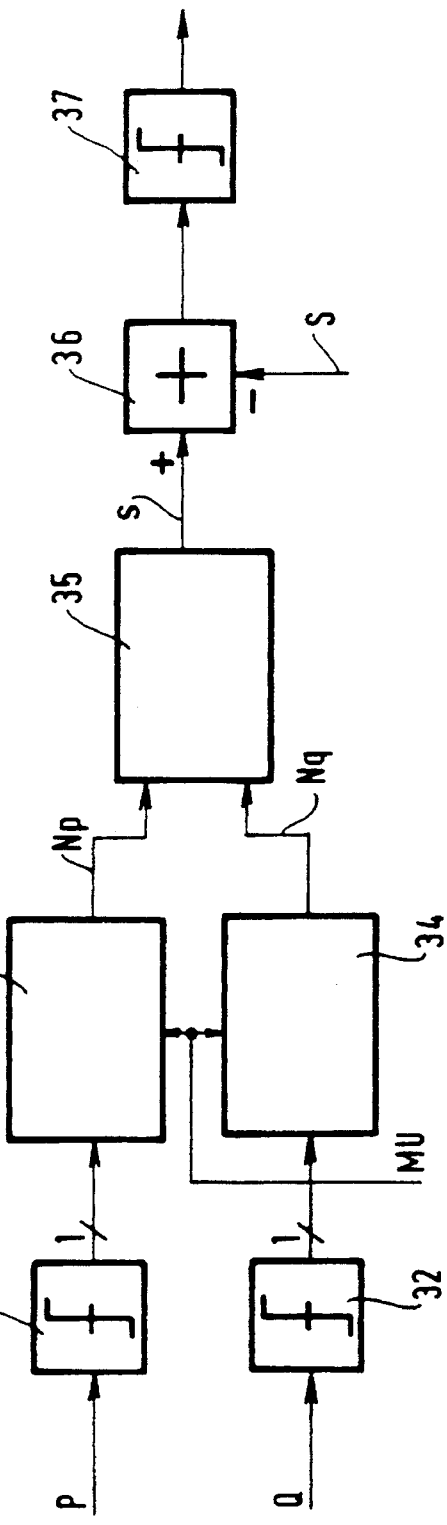
FIG. 3 shows a prior art singular word detector device.
Figure 4:
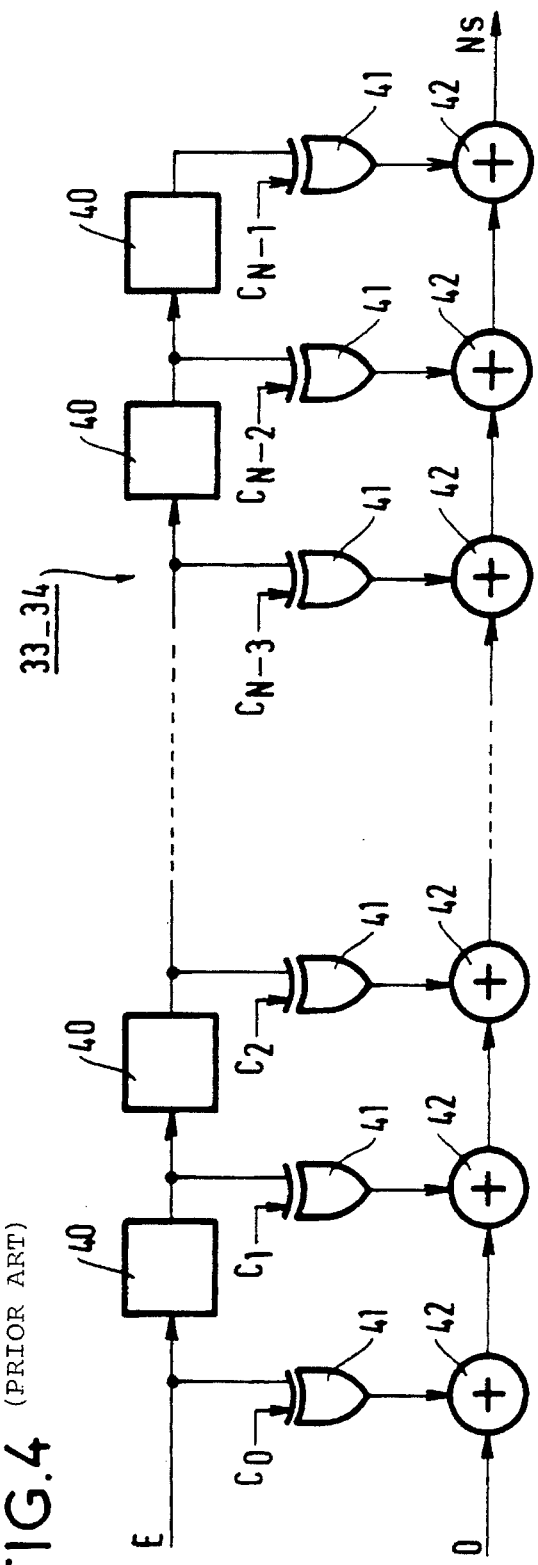
FIG. 4 shows a correlator from FIG. 3.

The P and Q channel samples $\underline{p}$ and $\underline{q}$ from a carrier recovery device such as that shown in FIG. 2 are fed to π/4 angular shifter means, in this example a three-bit adder 60 ("Soft Decision") and a three-bit subtractor 61, respectively supplying p+q and p−q (quantized on four bits). This rotates the samples received.

This rotation can be expressed as follows:

$$z_k = (1-j) \cdot r_k = z^c_k + j \cdot z^s_k$$

where $r_k$ is the complex envelope of the sample received at time k.Ts (Ts=1/Hs=symbol time), where $$r_k = \sqrt{2E_b} \cdot a_{k+d} \cdot e^{j\theta} + n_k$$

where θ represents the phase ambiguity (θ=0, π/2, π or 3π/2) $n_k$ is complex white noise ($n_k = n^c_k + jn^s_k$), $E_b$ is the energy per coded sample and $\underline{d}$ is the time-delay (expressed as a number of samples) of the receiver relative to the received signal.

The real and imaginary components of $z_k$ are fed on a main channel to decision units 62, 63 followed by a time-delay circuit 64 for compensating N samples. They are fed on an auxiliary channel to energy estimator means adapted to detect which of the real and imaginary channels of the main channel is carrying the greater energy. In this example the estimator means comprise absolute value circuits 65, 66 followed by accumulators 67, 68 which accumulate N samples and have a reset input RAZ and a comparator 69 receiving the output signals of the accumulators 67 and 68.

The absolute value circuits 65 and 66 and the accumulators 67 and 68 detect the "energy" available on the real and imaginary channels, so that received signal phase ambiguities can be resolved, especially in the preamble of each packet. It is thus possible to detect if the received constellation is on the real axis (θ=0 or π) or on the imaginary axis (θ=π/2 or 3π/2). The accumulators 67 and 68 sum the absolute values of N consecutive samples and supply and output signal at the frequency Fs/N where Fs=1/Ts.

Note that the absolute value circuits 65 and 66 can also be replaced by circuits for squaring each sample, although this implementation is more complex.

The accumulation of the absolute values of the real and imaginary components of $z_k$ can be written:

$$R = \sum_{i=0}^{i=N} |z_i^c| \text{ and } I = \sum_{i=0}^{i=N} |z_i^s|$$

where N is the number of samples in the singular word MU and the time-delay (expressed as a number of samples) introduced by the circuit 64.

The respective outputs R and I of the accumulators 67 and 68 are applied to the comparator 69 which compares R to I and supplies to a multiplexer 70 receiving the time-delayed real and imaginary channels (of the main channel) information such that the multiplexer supplies at its output one of the time-delayed channels of the main channel, this time-delayed channel corresponding to that conveying the greater energy.

The multiplexer 70 accordingly supplies to the correlator 71, which also receives the singular word MU, the signals on the channel carrying the greater energy, either the real channel or the imaginary channel. The correlator 71 can be identical to that described with reference to FIG. 5 and supplies a correlation level $\underline{x}$ depending on the Hamming distance between the reference singular word MU and the samples of the selected channel to comparator means 72, 73 comparing the computed correlation level $\underline{x}$ with a threshold S to indicate detection of the singular word in the signal applied to the correlator 71.

In the embodiment shown the comparator means comprise a computation circuit 72 supplying an output level $\underline{s}$ equal to:

$$s = |N - 2x|$$

This output level $\underline{s}$ is compared with the threshold S in a subtractor 73 receiving the threshold S and followed by a decision unit 74 indicating whether the singular word has been detected in the received signal.

The output signals of the comparator 69 and the correlator 71 can also be fed to an optional ambiguity resolving circuit 75 which determines the phase Θ of the received constellation. The phase Θ is determined from the following table:

| Decision at exit from comparator 69 | Value of N − 2x | Phase Θ |
| --- | --- | --- |
| R > I | N − 2x > 0 | 0 |
| R > I | N − 2x < 0 | π |
| R < I | N − 2x > 0 | π/2 |
| R < I | N − 2x < 0 | 3π/2 |

The value of Θ is supplied to a demodulator 76 which also receives the complex envelope $r_k$. The demodulator 76 includes a Viterbi decoder, for example, which is not transparent to cycle skipping and which therefore needs to know e to decode the signals supplied to it. Naturally, if the demodulator 76 does not require the cycle skipping information, the ambiguity resolving circuit 75 is not needed.

The invention can use a relatively wide carrier recovery loop bandwidth (filter 23 in FIG. 2) so that the phase of the recovered carrier can be stabilized when the singular word appears with the result that the local bit error rate at the start of the wanted information can be reduced in the information samples, without lengthening the preamble.

Figure 7:
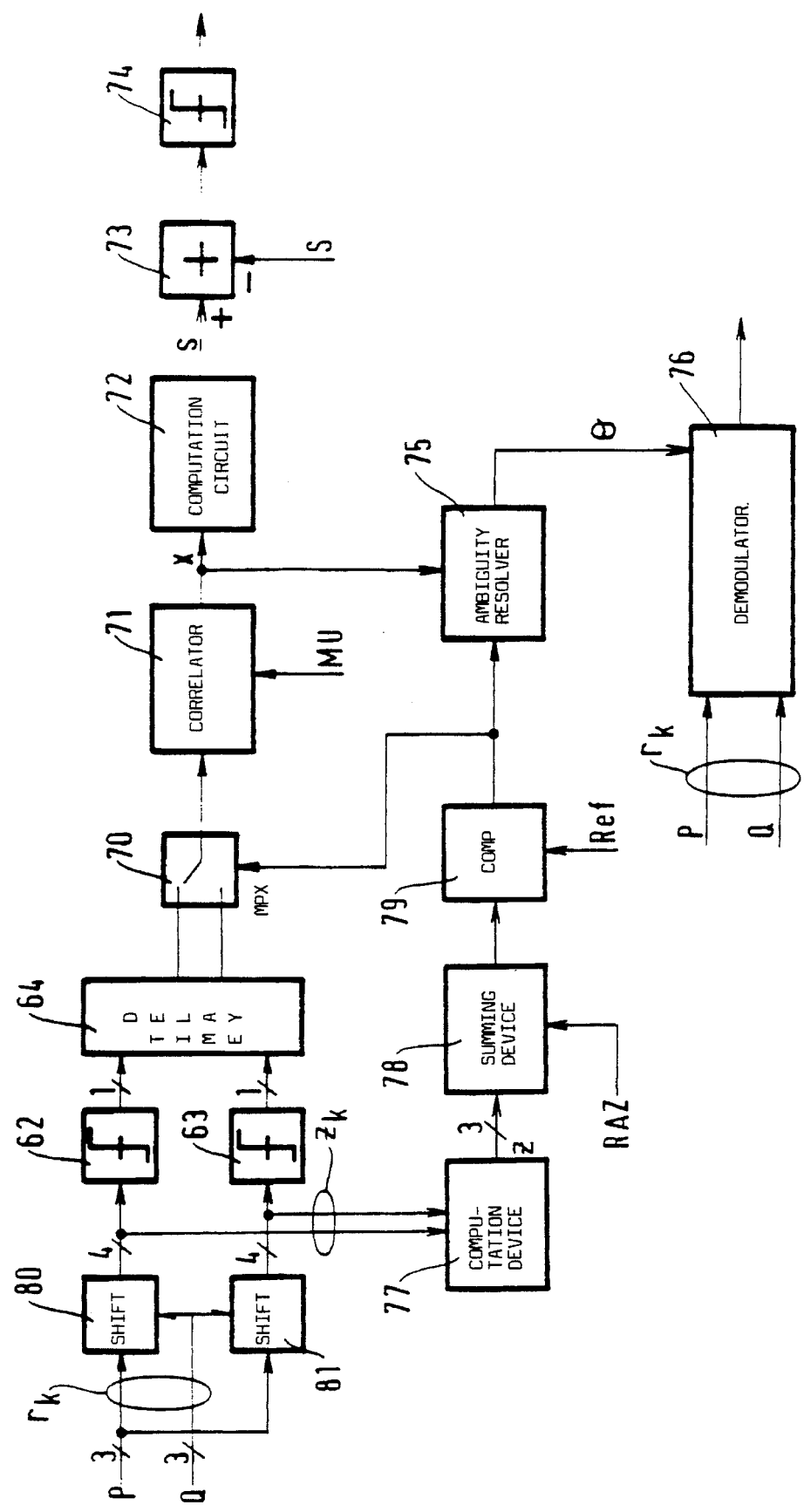
FIG. 7 is a block diagram of a second embodiment of singular word detector device in accordance with the invention.

FIG. 7 is a block diagram of a second embodiment of the singular word detector device of the invention. This embodiment is closer to a real implementation of the device of the invention because it allows for the fact that operation is to a finite precision (three bits), whereas the device of FIG. 6 is more conceptual and assumes the processing of real samples.

The π/4 angular shifter means in this embodiment comprise modules 80 and 81, the former supplying p+q+1 and the latter q−p at its respective output at each symbol time, where $\underline{p}$ and $\underline{q}$ are respectively samples coded on three bits on channels P and Q in each symbol time Ts, for example. These operations also rotate by π/4 the constellation of the complex envelope $r_k$. The outputs of the modules 80 and 81 are supplied to the estimator means which include computation means 77 computing the detected energy difference between each sample p+q+1 on the real channel and each sample q−p on the imaginary channel received at the same time. In each symbol time the computation means 77 supply a magnitude $\underline{z}$ equal to:

$$z = \frac{|p+q+1| - |q-p| - 1}{2}$$

Note that this computation gains one bit in the computation of $\underline{z}$. If the analog-digital converters of the sampling devices 26 and 27 in FIG. 2 are three-bit devices, each supplies samples with values between −4 and +3 ($\underline{p}$ or $\underline{q}$ have the value $$\left\lfloor \frac{Ve}{\delta} \right\rfloor$$

where Ve is the converter input voltage and δ is the quantum). An output value δ of a converter can then be regarded as a voltage equal to (a+½).δ. Thus the sum of the voltages Vp and Vq, respectively converted into $\underline{p}$ and $\underline{q}$, is written (p+q+1).δ while the difference is written (p−q).67 .

The magnitude $\underline{z}$, which is also coded on three bits, for example, is supplied to single summing means 78 which sum for N samples the energy differences computed by the computing means 77. The summing means 78 are followed by comparator means 79 comparing the sum over N samples of these energy differences with a reference value Ref substantially equal to half the sum of the energy differences over N samples. The comparator means 79 then generate the indication of the channel conveying the greater energy, which is supplied to the multiplexer 70 so that the latter supplies to the correlator 71, as previously, the channel conveying the greater energy, either the real channel or the imaginary channel.

This embodiment has the advantage of requiring only one summing device 78, instead of two (67, 68) in the FIG. 6 embodiment.

Figure 8A:
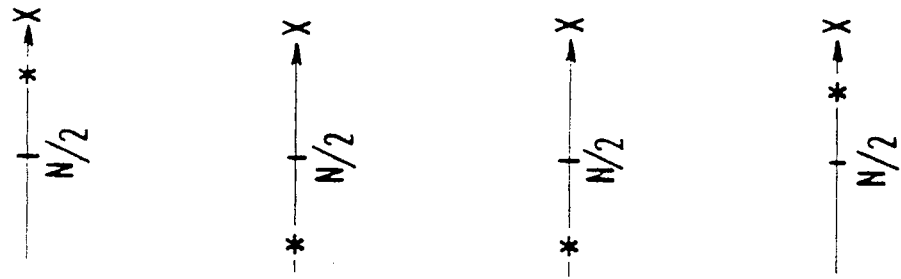
FIGS. 8A through 8D are graphical representations of the processing applied.

FIGS. 8A through 8D are correlative graphical representations of the processing effected. FIG. 8A shows the various possible configurations of the constellation received, the signal being BPSK modulated (to be more precise, using only two opposite states of QPSK modulation).

The dots correspond to −1 levels and the crosses to +1 levels. The first constellation shown has not undergone any phase-shift (Θ=0°), the second a phase-shift of 180°, the third a phase-shift of −90° and the last a phase-shift of +90°.

Figure 8B:
Figure 8C:
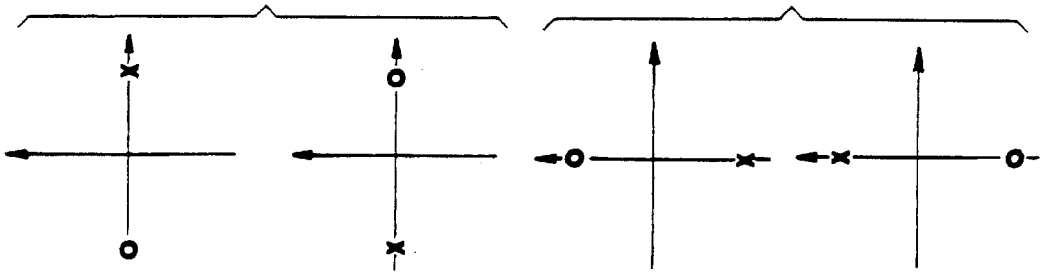

The correlative constellations after rotation by π/4 are shown in FIG. 8B. The various samples are placed on the real axes (for Θ=0° and 180°) or on the imaginary axes (for Θ=±90°). Note that this rotation improves the signal to noise ratio 3 dB. It can be ±π/4. It is then possible by energy detection to determine on which of the two axes the samples are located and to decide (FIG. 8C) that the latter are on the real axis (asterisk in the area between the real axis and the first bisector, Θ=0 or 180°) or on the imaginary axis (asterisk in the area between the imaginary axis and the first bisector, Θ=±90°).

Figure 8D:
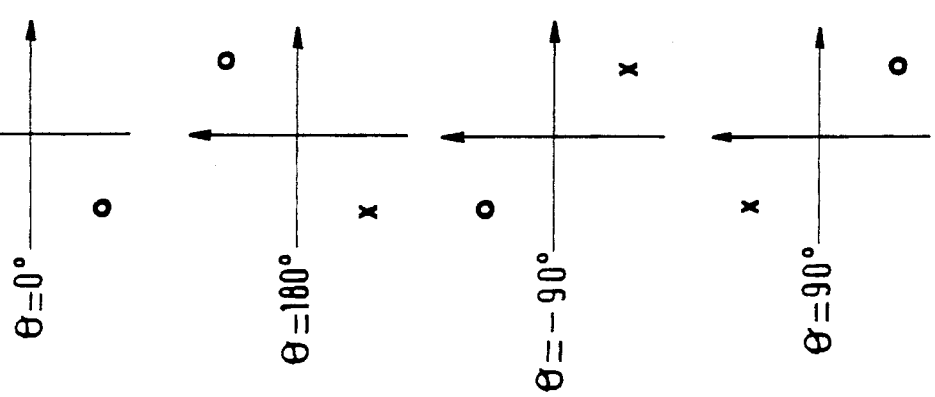

FIG. 8D shows the correlation levels $\underline{x}$ at the output of the correlator 72 for various values of e relative to N/2. The value of $\underline{x}$ is greater than N/2 for Θ=0 or +π/2 and less than N/2 for Θ=πor −π/2. The calculation of |N−2x| carried out by the computation circuit 72 produces a value comparable to the threshold S.

The value of N depends on the length of the singular word MU and is preferably equal to the number of samples in the singular word. In this example N=32.

Operation in tracking and search mode is described below:

In tracking mode, the energy detection applies to the first N samples in the search window. This search window is opened approximately halfway through the timing recovery word RR to allow for temporal drift. The accumulator(s) of the auxiliary channel are reset (command RAZ) when the window opening signal is activated. The output of the multiplexer 70 is maintained in the same condition throughout the duration of the packet correlation test. When the output of the decision circuit 74 changes state, the packet arrival time and thus the position of the first data samples are known.

In synchronization search mode there is no search window synchronization and the correlator 71 is reset every N samples. It therefore generates information at a frequency N times less than the symbol frequency Fs. The information produced at the output of the comparator is used to set the multiplexer 70 to the correct position and the packet is declared to be detected when two overshoots of the threshold S occur separated by N samples.

The singular word detection method of the invention therefore consist in:

shifting by π/4 the constellation of the complex envelope of a signal output by a carrier recovery device;

detecting which real or imaginary channel of said constellation carries the greater energy and computing a correlation level between the digital signal conveyed by this channel and a reference singular word;

supplying an indication of detection of said singular word in said signal of said channel conveying the greater energy if said correlation level exceeds a predetermined value.

There is claimed:

1. A BPSK modulated singular word detector device for a TDMA modem comprising a device for recovering the carrier of a received signal and supplying the complex envelope of said received signal on a real channel and an imaginary channel, said device comprising:

means applying an angular offset of $\pi/4$ to the constellation of said complex envelope, said angular offset means supplying a complex signal on a main channel and on an auxiliary channel each comprising a real channel and an imaginary channel;

N sample delay means on said main channel supplying time-delayed samples to a multiplexer on a time-delayed real channel and a time-delayed imaginary channel;

estimator means on said auxiliary channel to estimate which of said real and imaginary channels of said auxiliary channel is conveying greater energy, said estimator means supplying information to said multiplexer so that the latter supplies at its output whichever of the time-delayed real or imaginary channels of said main channel corresponds to that of said channels of said auxiliary channel conveying the greater energy;

a correlator receiving a reference singular word and computing a correlation level between the output signal of said multiplexer and said reference singular word;

comparator means comparing said correlation level with a threshold value to indicate detection of said singular word in the signal of said channel applied to said correlator if said correlation level is greater than said threshold vale; and ambiguity resolving means receiving said information supplied to said multiplexer and said correlation level and supplying to a demodulator the value of said angular offset of said constellation relative to a reference angle.

2. A device according to claim 1, wherein said estimator means comprise:

means summing over N samples the energy detected on each of said real and imaginary channels of said auxiliary channel;

means comparing said summed energies, said comparator means supplying said information to said multiplexer so that the latter supplies at its output whichever of said time-delayed real or imaginary channels corresponds to that of said channels of said auxiliary channel for which the sum of the energies is the greater.

3. A device according to claim 1, wherein said estimator means comprise:

means computing the detected energy difference between each sample of said real channel and each sample of said imaginary channel received at the same time;

means summing said energy differences over N samples; and means comparing the sum of said energy differences with a reference value substantially equal to half the sum of said energy differences to determine which of said real and imaginary channels of said auxiliary channel is conveying the greater energy and to generate said information supplied to said multiplexer based on the determination.

* * * * *